July 25, 1944. J. JANDASEK 2,354,597
TURBO TRANSMISSION
Original Filed March 25, 1937
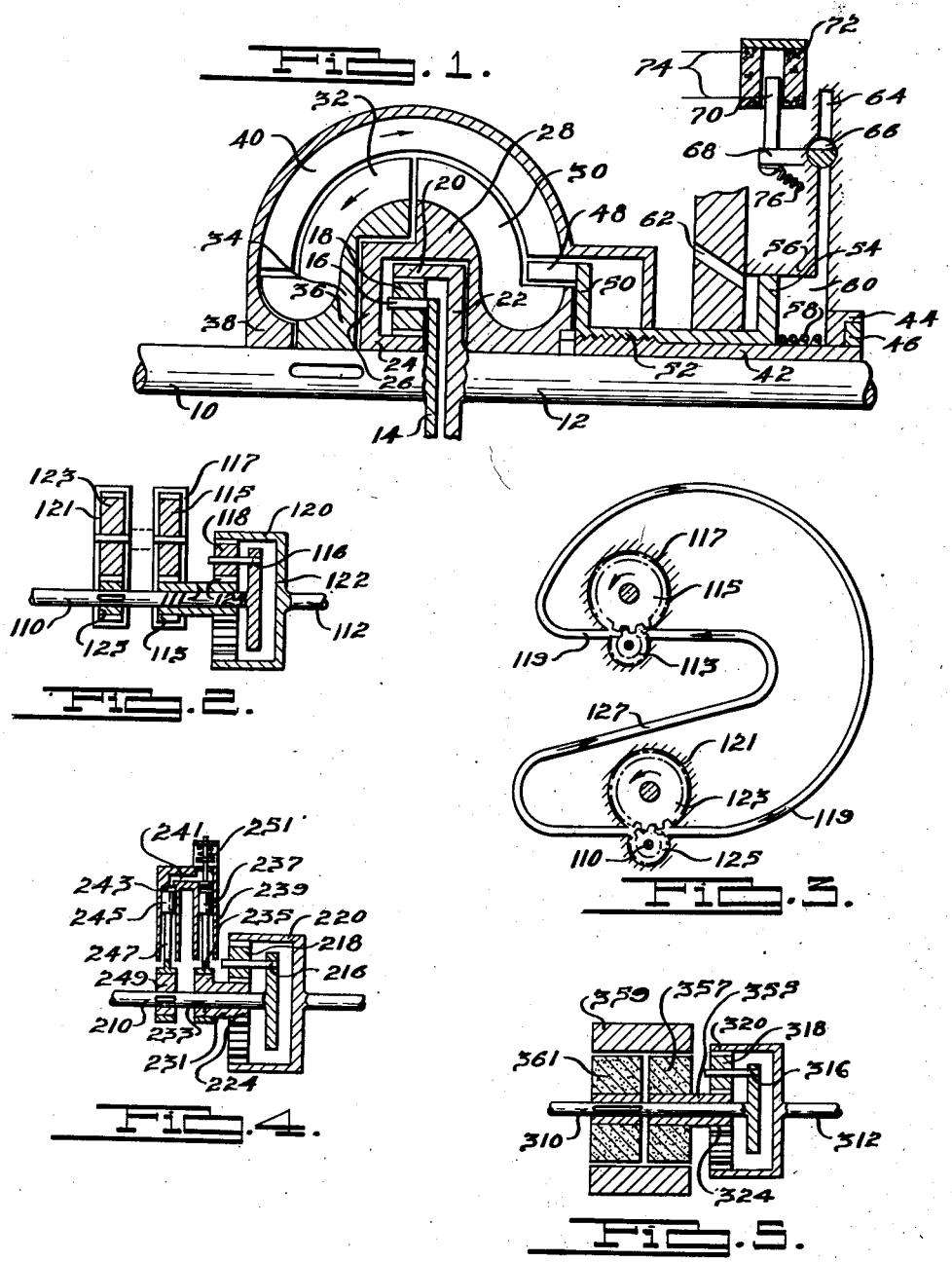
INVENTOR
Joseph Jandasek.
BY
ATTORNEYS.

Patented July 25, 1944

2,354,597

UNITED STATES PATENT OFFICE 2,354,597

TURBOTRANSMISSION

Joseph Jandasek, Detroit, Mich., assignor to Bendix Aviation Corporation, South Bend, Ind., a corporation of Delaware Original application March 25, 1937, Serial No. 132,925. Divided and this application February 14, 1941, Serial No. 378,841

19 Claims. (Cl. 74—189.5)

This invention relates to transmissions and more particularly to regenerative power transmitting means whereby variable torque may be exerted on a driven shaft in accordance with the load to which the driven shaft is subjected.

In the transmission of power by mechanical gearing such for example as by the use of a stepped transmission wherein varying gear ratios are employed, it is necessary that the driving shaft exert sufficient power through the mechanical gearing to move the maximum load to which the driven shaft is subjected. In power transmitting devices wherein the load varies through wide limits, an involved stepped transmission having many different gear ratios is required to provide a desired degree of flexibility of driving characteristics.

Where regenerative power transmitting means of the type contemplated herein are employed it is possible to exert great power on the driven shaft without complicating the structure by providing a multi-stage transmission and without providing means to exert sufficient power on the driving shaft to move the driven shaft when subjected to maximum load.

An object of this invention is therefore to provide regenerative power transmitting means wherein a portion of the applied power may be passed directly to a driven shaft and a portion of the applied power may be redirected to be again exerted on the driving shaft.

Another object resides in the provision of power transmitting means wherein a portion of the power is transmitted from a driving to a driven shaft through mechanical gearing and the remainder of the applied power is regenerated through liquid actuated power transmitting means to be again exerted on a driving shaft.

A further object resides in the provision of planetary gearing between driving and driven shafts wherein a portion of the power exerted by the driving shaft is exerted through the planetary gearing directly to the driven shaft and the remainder of the power is transmitted through the planetary gearing to be exerted on the driving shaft.

Still another object is to provide a power transmitting mechanism wherein power exerted by a driving shaft is divided into two paths, a portion flowing directly to the driven shaft and another portion flowing through regenerative means to exert a driving force on the driving shaft and wherein the proportion of power transmitted through each of the paths varies in accordance with variations of speed between the driving and driven shafts.

Still another object is to provide a two-path power transmitting mechanism wherein a varying proportion of power is transmitted through mechanical gearing from a driving shaft to a driven shaft and the remainder of the power is regenerated through fluid pressure operated means to be exerted back on the driving shaft.

Yet a still further object resides in the provision of means responsive to the speed and torque of the driven shaft to vary the torque transmitting characteristics of a fluid actuated power transmitting device interposed in a regenerative power transmitting mechanism associated with driving and driven shafts.

Other objects and advantages of this invention will be apparent from the following detailed description considered in connection with the accompanying drawing, submitted for purposes of illustration only, and not intended to define the scope of the invention, reference being had for that purpose to the subjoined claims.

In the drawing wherein similar reference characters refer to similar parts throughout the several views:

Fig. 1 is a longitudinal sectional view of a power transmitting device embodying the present invention.

Fig. 2 is a longitudinal sectional view of a modified form of the invention.

Fig. 3 is a diagrammatic view illustrating the operation of the device illustrated in Fig. 2.

Fig. 4 is a longitudinal sectional view of a still further modified form of the invention.

Fig. 5 is also a longitudinal sectional view of another modified form of the invention.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring now to Fig. 1, it will be observed that a driving shaft 10 is provided to transmit power to a driven shaft 12. The driving shaft 10 is provided with a flange 14 having a plurality of spaced projections 16 which support spaced pinions 18 interposed between a ring gear 20 carried by a flange 22 operably connected to the driving shaft 12 and a sun gear 24 concentrically mounted relative to the driving shaft 10.

The sun gear 24 is provided with a radially extending flange 26 which carries an impeller web 28 having arranged thereon suitable vanes to provide a fluid energizing impeller channel 30. The impeller channel 30 terminates in alignment with a turbine channel 32 including suitable vanes carried by a turbine web 34 mounted on a turbine hub 36 suitably attached to the driving shaft 10.

A rotatable housing 38 is concentrically mounted relative to the driving and driven shafts and provides a passage 40 for the return of the liquid from the turbine channel 32 to the impeller channel 30.

A sleeve 42 rotatably mounted on the driven shaft 12 is extended through a stationary member 44 and a one-way brake 46 is interposed between the sleeve and stationary member whereby the sleeve 42 may rotate freely in one direction and may be held against rotation in the opposite direction.

Guide wheel means including suitable vanes 48 may be introduced into or withdrawn from the power transmitting fluid circuit as for example between the outlet from the channel 40 and the inlet to the impeller channel 30. The guide wheel 48 may be carried by a flange 50 fixed to a sleeve 52 mounted on suitable threads between it and the relatively fixed sleeve 42 in such a manner that the guide wheel 48 may move axially relative to the driven shaft 12 into or out of the power transmitting fluid circuit. The sleeve 52 may be provided with a piston 54 slidably mounted in a cylinder 60 formed between the sleeve 42 and a stationary member 56. Yielding means such for example as a spring 58 may be provided to yieldingly urge the guide wheel 48 into the power transmitting fluid circuit, thereby increasing the force exerted by the fluid reaction in the fluid circuit tending to move the guide wheel into the circuit.

Means may be provided to variably resist the force urging the guide wheel into the power transmitting fluid circuit. One desirable form of such means includes torque responsive means such for example as subjecting the cylinder 60 to variations of manifold pressure in such a manner that the piston 54 will be urged outwardly to withdraw the guide wheel from the power transmitting fluid circuit when the torque transmitted is low and to permit the guide wheel to be moved into the fluid circuit when the torque transmitted reaches a substantially predetermined high value.

A vent 62 may be provided to vent the cylinder 60 behind the piston 54 to atmosphere. The vent 62 may be suitably calibrated to meter the flow of fluid between the cylinder 60 behind the piston 54 and the atmosphere to provide a dashpot effect thereby cushioning movement of the piston 54 in the cylinder 60.

The cylinder 60 may be subjected to variations in manifold pressure by means of a conduit 64 having a valve 66 therein. The valve 66 may be controlled by an arm 68 which supports a solenoid core 70 received by the winding 72 of the solenoid. The solenoid may be energized by means of electric conduits 74 to urge the plunger upwardly relative to the winding 72 to open the valve 66 against the resistance of a spring 76. The electric conduits 74 may be operably connected to a torque and speed responsive governor operably connected to the driven shaft 12.

Figs. 2 and 3 illustrate an embodiment of the invention which is similar in certain respects to the embodiment of Fig. 1. Corresponding parts have therefore been given corresponding reference numerals with the addition of 100.

It will be observed that the sun gear 124 is provided with a sleeve 111 having a gear 113 meshing with a gear 115 suitably mounted in a casing 117 forming a primary pump to produce fluid pressure and transmit it through a conduit 119 (Fig. 3) to the interior of a casing 121 housing suitable gears 123 and 125. The pressure applied through the conduit 119 drives the gears 123 and 125 of a motor. The gear 125 of the motor is fixed to the driving shaft 110 in such a manner that power is regenerated and applied to the driving shaft 110. The casing 121 is provided with a conduit 127 interconnecting the casing 121 with the casing 117 of the gear pump 113—115 to return liquid to the primary pump.

The embodiment illustrated in Fig. 4 is similar in many respects to the embodiment of Fig. 1. Corresponding parts have therefore been given corresponding reference numerals with the addition of 200.

The sun gear 224 is provided with a sleeve 231 having an eccentric 233 which receives a connecting rod 235 operably connected to a piston 237 slidably mounted in a cylinder 239. The cylinder 239 is connected by way of a conduit 241 with a cylinder 243 having a piston 245 slidably mounted therein. The piston 245 is carried by the connecting rod 247 suitably mounted on an eccentric 249 fixed to the driving shaft 210. The conduit 241 may be controlled by a suitable spring pressed valve 251 to maintain the conduit closed until the pressure developed within the cylinder 239 approaches a substantially predetermined value.

The embodiment of Fig. 5 is similar in certain respects to the embodiment of Fig. 1. Corresponding parts have therefore been given corresponding reference numerals with the addition of 300.

The sun gear 324 is provided with a sleeve 355 which carries an armature 357 cooperating with a stator or magnet 359 to generate electrical energy and transmit it to an armature 361 of a motor. The armature 361 is fixed to the driving shaft 310 in such a manner as to exert a driving force to rotate the driving shaft 310.

This is a division of my co-pending application Serial No. 132,925, filed March 25, 1937.

I claim:

1. In a power transmitting device, a driving shaft, a driven shaft, and regenerative power transmitting means including fluid energizing and energy absorbing means interposed between the driving and driven shafts and comprising planetary gearing operably connected to transmit power to the driven shaft and to redirect power to the driving shaft, and a rotatable housing concentrically mounted on the driving and driven shafts and enclosing said means.

2. A power transmitting device comprising a driving shaft, planetary gearing carried by the driving shaft, a driven shaft, connecting means between the planetary gearing and the driven shaft, connecting means between the planetary gearing and the driving shaft comprising a fluid operated turbodevice having an impeller surrounding the planetary gearing whereby a varying proportion of power exerted on the driving shaft may be redirected through the fluid circuit to the driving shaft.

3. In a turbotransmission, a driving shaft, a driven shaft, planetary gearing interposed between the driving and driven shafts, and fluid operated power transmitting means including an impeller surrounding the planetary gearing and driven thereby and a turbine operably connected to the driving shaft to redirect a varying proportion of the power back to the driving shaft.

4. A power transmitting device comprising a driving shaft, a driven shaft, planetary gearing interposed between the driving and driven shafts, regenerative fluid power transmitting means including an impeller driven by the planetary gearing, a turbine directly connected to the driving shaft, the impeller and turbine members cooperating to form a power transmitting fluid circuit, a stationary member, guide wheel means adapted to be introduced into the power transmitting fluid circuit to operate the fluid power transmitting means as a torque converter or to be withdrawn from the power transmitting fluid circuit to operate the device as a turboclutch, and means responsive to variations of speed and torque of the driven shaft controlling the position of the guide wheel.

5. In a power transmitting device, a driving shaft, a flange associated with the driving shaft, a plurality of spaced planet pinions carried by the flange, a ring gear engaging the planet pinions, a driven shaft, connecting means between the ring gear and the driven shaft, a sun gear engaging the planet pinions, and regenerative fluid operated driving means between the sun gear and the driving shaft and having a fluid energizing impeller surrounding said pinions and gears.

6. In a power transmitting device, a driving shaft, a driven shaft, planetary gearing interposed between the driving and driven shafts to transmit a portion of the power directly from the driving shaft to the driven shaft, and fluid actuated means including a driving member surrounding the planetary gearing and a driven member directly connected to the driving shaft for returning the remainder of said power to the driving shaft.

7. A power transmitter comprising driving and driven shafts, planetary gearing between the driving and driven shafts, regenerative power-transmitting means comprising a fluid-energizing member surrounding the planetary gearing and operably connected to the planetary gearing and an energy-absorbing member connected to the driving shaft and cooperating with the fluid-energizing member to form a power-transmitting fluid circuit whereby at slow speeds or heavy loads the majority of the power transmitted may be redirected to and exerted on the driving shaft and whereby at light loads or high speeds the majority of the power may be transmitted directly to the driven shaft.

8. In a power transmitting device, a driving shaft, a flange associated with the driving shaft, a plurality of spaced planet pinions carried by the flange, a ring gear engaging the planet pinions, a driven shaft, connecting means between the ring gear and the driven shaft, a sun gear engaging the planet pinions, regenerative driving means including an impeller surrounding the pinions and gears and operably connected to the sun gear, a turbine directly connected to the driving shaft, and a fluid passage interconnecting the outlet from the turbine with the inlet of the impeller.

9. In a power transmitting device, a driving shaft, a driven shaft, planetary gearing interconnecting the driving and driven shafts, regenerative power transmitting means between the driving and driven shafts comprising a turbounit having an impeller driven by the planetary gearing, a turbine carried by the driving shaft, and a substantially U-shaped channel whereby fluid may be directed from the outlet of the turbine to the inlet of the impeller.

10. In a power transmitting device, a driving shaft, a driven shaft, planetary gearing interconnecting the driving and driven shafts, regenerative power transmitting means between the driving and driven shafts comprising a turbounit having an impeller driven by the planetary gearing, a turbine carried by the driving shaft, a substantially U-shaped channel whereby fluid may be directed from the outlet of the turbine to the inlet of the impeller, a stationary member, a guide wheel, connecting means between the guide wheel and stationary member whereby the guide wheel may be introduced into the power transmitting fluid circuit to operate the turbounit as a torque converter or withdrawn from the fluid circuit to operate the turbounit as a turboclutch, means including a cylinder influencing the position of the guide wheel, means to subject the cylinder to variations of fluid pressure in proportion to variations of torque, an orifice communicating with the cylinder whereby the flow of fluid to and from the cylinder may be metered to give a dashpot effect.

11. In a power transmitting device, a driving shaft, a driven shaft, regenerative power transmitting means between the driving and driven shafts comprising a turbounit having an impeller driven by the planetary gearing, a turbine carried by the driving shaft, means whereby the guide wheel may be introduced into the power transmitting fluid circuit to operate the turbounit as a torque converter or withdrawn therefrom to operate the device as a turboclutch, means including a piston slidably mounted in a cylinder influencing the position of the guide wheel, means to subject the cylinder to variations of fluid pressure in proportion to variations of torque, an orifice communicating with the cylinder whereby the flow of fluid to and from the cylinder may be metered to cushion and retard movement of the piston in the cylinder.

12. A regenerative power transmission comprising a driving shaft, a driven shaft, a gearing system connecting the shafts, an impeller housing the gearing system and connected thereto, and a turbine on the driving shaft for cooperation with the impeller.

13. A regenerative power transmission comprising a driving shaft, a driven shaft, planetary gearing coupling the shafts, a fluid power transmission including an impeller housing the planetary gearing, and operatively connected thereto, and a turbine on the driving shaft for cooperation with the impeller.

14. A regenerative power transmission comprising a driving shaft, a driven shaft, a gearing system coupling the shafts, an impeller mounted for free rotation on the shafts, said impeller enclosing the gearing system and operatively connected thereto, and a turbine on the driving shaft for cooperation with the impeller.

15. A regenerative power transmission comprising a driving shaft, a driven shaft, mechanical power transmission means coupling the shafts, and fluid power transmission means rotatably mounted on the driving and driven shafts and housing the mechanical transmission means and connected between the driving shaft and the mechanical transmission means.

16. A regenerative power transmission comprising a driving shaft, a driven shaft, a gearing system connecting the shafts, a fluid power transmission including an impeller mounted for free rotation on said shafts and housing the gearing system, a turbine for cooperation with the impeller providing in conjunction therewith a fluid circuit, and a reaction member movable into and out of the circuit under the influence of dynamic pressure on the fluid in the unit.

17. A regenerative power transmission comprising a driving shaft, a driven shaft, a gearing system connected between the shafts, a fluid power transmitting unit including an impeller connected in the gearing system and providing a housing therefor, a turbine on the driving shaft for cooperation with the impeller providing in conjunction therewith a fluid circuit, a reaction member movable into and out of the circuit under the influence of dynamic pressure on the fluid in the unit, and a housing supported on the driving shaft providing a passage for circulation of fluid between the turbine and the impeller.

18. In a power transmitting device, a driving shaft, a driven shaft, planetary gearing between the driving and driven shafts, an auxiliary path of power flow extending parallel to the planetary gearing and comprising fluid energizing and energy absorbing means, and a rotatable housing concentrically mounted on the driving and driven shafts and enclosing the planetary gearing and the auxiliary path of power.

19. A variable speed transmission comprising a drive shaft, a driven shaft coaxial therewith, a fluid torque converter and a planetary gear construction, said fluid torque converter comprising a drive rotor, a stator and a driven rotor, said planetary gear construction comprising a sun gear, a ring gear, a gear carrier and planetary gearing carried by said gear carrier and meshing with said sun gear and ring gear, said gear carrier being connected to rotate with said drive shaft, said ring gear being connected to rotate with said driven shaft, and said torque converter serving to transmit power between said sun gear and one of said shafts, said drive rotor being connected to rotate with the sun gear and said driven rotor being connected to rotate with the drive shaft.

JOSEPH JANDASEK.